United States Patent
Vieri

[11] B 3,922,595
[45] Nov. 25, 1975

[54] HIGH POWER REGULATED D.C. SUPPLY

[75] Inventor: Bruno John Vieri, Penfield, N.Y.

[73] Assignee: Xerox Corporation, Stamford, Conn.

[22] Filed: May 23, 1973

[21] Appl. No.: 363,457

[44] Published under the Trial Voluntary Protest Program on January 28, 1975 as document no. B 363,457.

[52] U.S. Cl............................. 321/47; 321/18
[51] Int. Cl.² .................................. H02M 7/155
[58] Field of Search ............... 321/15, 16, 18, 47

[56] References Cited
UNITED STATES PATENTS

| | | | |
|---|---|---|---|
| 3,211,985 | 10/1965 | Török | 321/47 X |
| 3,518,527 | 6/1970 | Russell | 321/18 |
| 3,733,540 | 5/1973 | Hawkins | 321/47 |
| 3,735,239 | 5/1973 | LaDuca | 321/16 |
| 3,745,439 | 7/1973 | Belmuth | 321/47 X |

*Primary Examiner*—R. N. Envall, Jr.

[57] ABSTRACT

A regulated AC to DC converter includes a pair of controlled gates which are triggered into conduction selectively during the positive and negative half cycles of the alternating current. An improved triggering circuit is provided which includes a monostable multi-vibrator for providing a train of trigger pulses, circuitry for driving the multi-vibrator to generate the train of trigger pulses, circuitry for triggering the controlled gates into conducting states selectively in response to the trailing edges of the train of trigger pulses and circuitry for applying a control current to the multi-vibrator for controlling the time position of the trailing edges of the trigger pulses relative to the phase of the alternating current applied to the converting means, whereby the duration of conduction of the controlled gates in the corresponding half cycle of the alternating current is controlled.

10 Claims, 9 Drawing Figures

HIGH POWER REGULATED D. C. SUPPLY

FIELD OF INVENTION

This invention relates to a regulated AC to DC converter in general, and more particularly to an improved high power regulated AC to DC converter having means for converting an alternating to a direct current that includes a pair of controlled gates which are triggered into conduction selectively during the positive and negative half cycle of the alternating current.

BACKGROUND OF THE INVENTION

According to the prior art, a regulated AC to DC converter is utilized to convert ordinary AC power line of 117 volts, 60 Hz., into a direct current stabilized at its mean level. Such a converter has wide application where mean level regulation is acceptable. According to the prior art, typically the regulation is achieved by utilizing means for converting an alternating to a direct current that includes a pair of controlled gates, which are triggered into conduction selectively during the positive and the negative half cycles of the AC. The regulation is achieved by phase-control of the controlled gates, by triggering the controlled gates into conduction so that the conduction duration of the controlled gates during the corresponding half cycles of the AC provides the required regulation of the output DC level.

SUMMARY OF THE INVENTION

It is, therefore, an object of the present invention to provide an improved regulated AC to DC converter.

It is another object of the present invention to provide an improved high-power regulated AC to DC converter.

It is still another object of the present invention to provide an improved triggering means for a regulated AC to DC converter having controlled gates.

It is still another object of the present invention to provide an AC to DC converter having an improved trigger means, which provides control over a wider range of voltage.

It is still another object of the present invention to provide an improved regulated AC to DC converter having means which facilitates overload protection.

It is still another object of the present invention to provide reliable and fail proof AC to DC conversion.

These and other objects of the present invention are achieved, according to the present invention, by providing an improved triggering means, which includes a monostable multi-vibrator for providing a train of trigger pulses, means for driving the multi-vibrator to generate the train of the trigger pulses, means for actuating the controlled gates into conductive states selectively in response to the trailing edges of the trigger pulses, and means for applying a control current to the multi-vibrator for controlling the time position of the trailing edges of the trigger pulses relative to the phase of the AC applied to the converting means, whereby the duration of the conduction of the controlled gates in the corresponding half cycle of the AC is controlled.

Another feature of the present invention is in the provision of means for detecting an overload condition and disabling the multi-vibrator driving means, whereby the generation of the trigger pulses is prevented.

Still another feature of the present invention is in the provision of means for generating a train of reset pulses and applying the reset pulses to the multi-vibrator timed to occur at zero crossings of the AC, whereby the monostable multi-vibrator is reset to assure that it is ready to generate the succeeding trigger pulse without failure.

Still another feature of the present invention is in the provision of means for referencing the control current to the output load condition, whereby the mean level of the DC output supply is controlled.

The foregoing and other objects and features of the present invention will be made clearer from the following detailed description of an illustrative embodiment of the present invention in conjunction with the accompanying drawings in which:

DETAILED DESCRIPTION OF AN ILLUSTRATIVE EMBODIMENT

Figure 1:
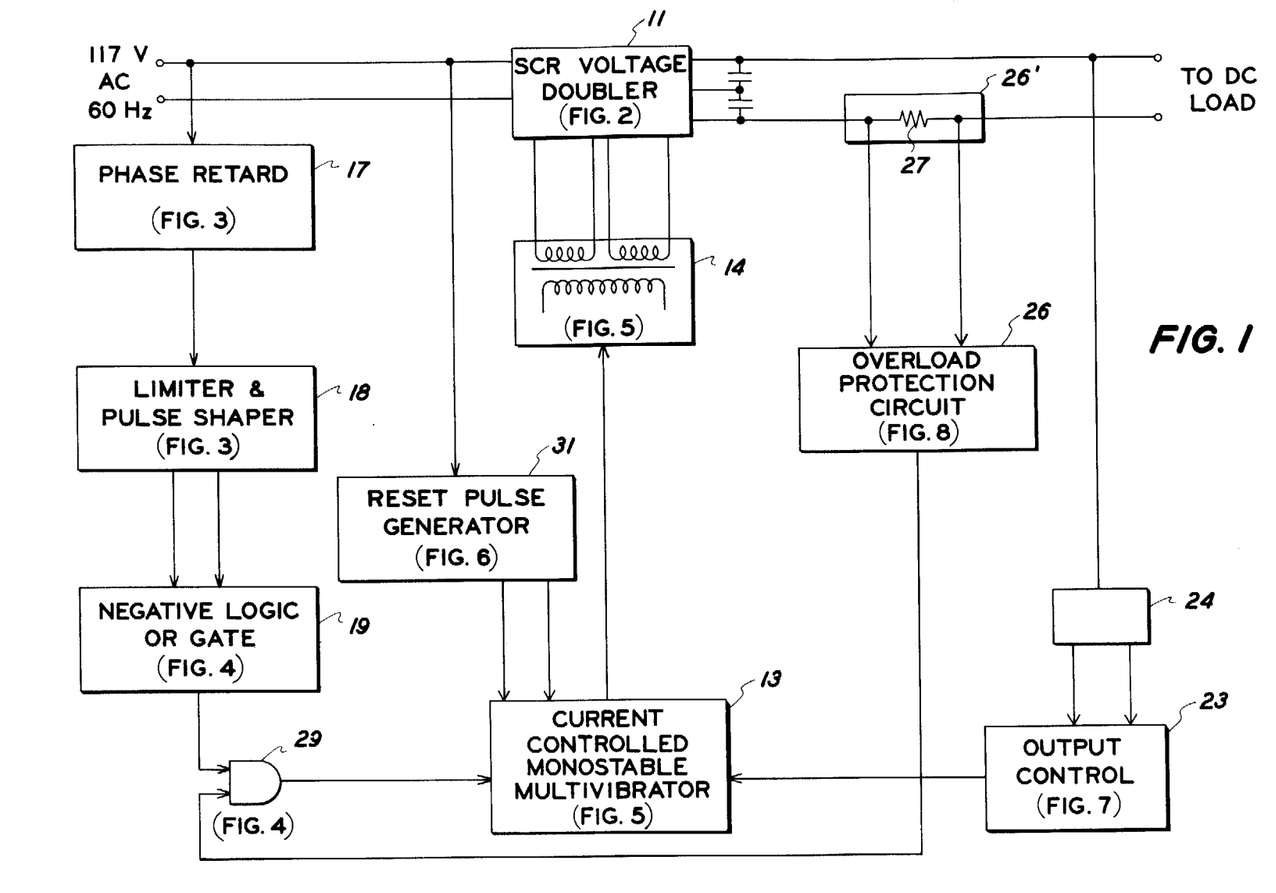
FIG. 1 shows an overall functional block diagram illustrative of a regulated AC to DC converter according to the present invention.

Referring to FIG. 1, a regulated AC to DC converter according to the present invention includes an AC to DC converting means 11, which may be provided with a pair of controlled gates such as silicon controlled rectifiers (SCR) that can be triggered into conduction selectively during the positive and negative half cycles of the AC by a train of trigger pulses from a triggering means. The triggering means includes a monostable multivibrator 13 which provides the train of trigger pulses and means 14 which actuates the control gates into conductive states selectively in response to the trigger pulses.

In accordance with an aspect of the present invention, the monostable multi-vibrator is set and reset in succession in a controlled manner in generating the train of trigger pulses as follows. The monostable multi-vibrator is triggered into its set state in succession by a train of pulses (hereinafter called monostable pulses to distinguish them from the trigger pulses used for actuating the controlled gates) at twice the repetition rate of the frequency of the AC power supply, but time displaced by 90° phase shift, that is, the pulses occur at the maximum of the positive and negative half cycles of the AC input. The monostable multi-vibrator switches into its metastable state in succession in response to the monostable pulses. It switches back to its stable state spontaneously (or after it is reset by the reset pulses). The successive setting and resetting of the monostable multi-vibrator results in the generation of a train of output pulses. The pulse width of each of the successive output pulses is determined by the level of the control current applied to the monostable multivibrator at that instant. The SCR trigger pulses are derived from the output pulses and they are effective at the end of said output pulses. More specifically, referring to FIGS. 1-9, the train of the pulses for triggering the monostable multi-vibrator, that is, the monostable pulses, may be derived preferably from the AC power supply itself by utilizing suitable circuitry that comprises a 90° phase retard circuit 17, limiting and pulse shaping circuit 18 and an OR gate 19 connected in series operatively to form a train of pulses (FIG. 9, $V_{tr}$) or monostable pulses having twice the repetition rate of the AC power and time displaced by 90° so that the pulses occur at the maximum of the positive and negative half cycles of the AC supply. In response to the monostable pulses, the normally stabilized monostable multi-vibrator 13 in its stable state is switched into its metastable state and after a momentary delay it resets or switches back into its stable state. In the process, the multi-vibrator 13 generates an output pulse. The width of the output pulse is controlled by the amount of the control current applied to the multivibrator from an output control current source 23.

Figure 9:
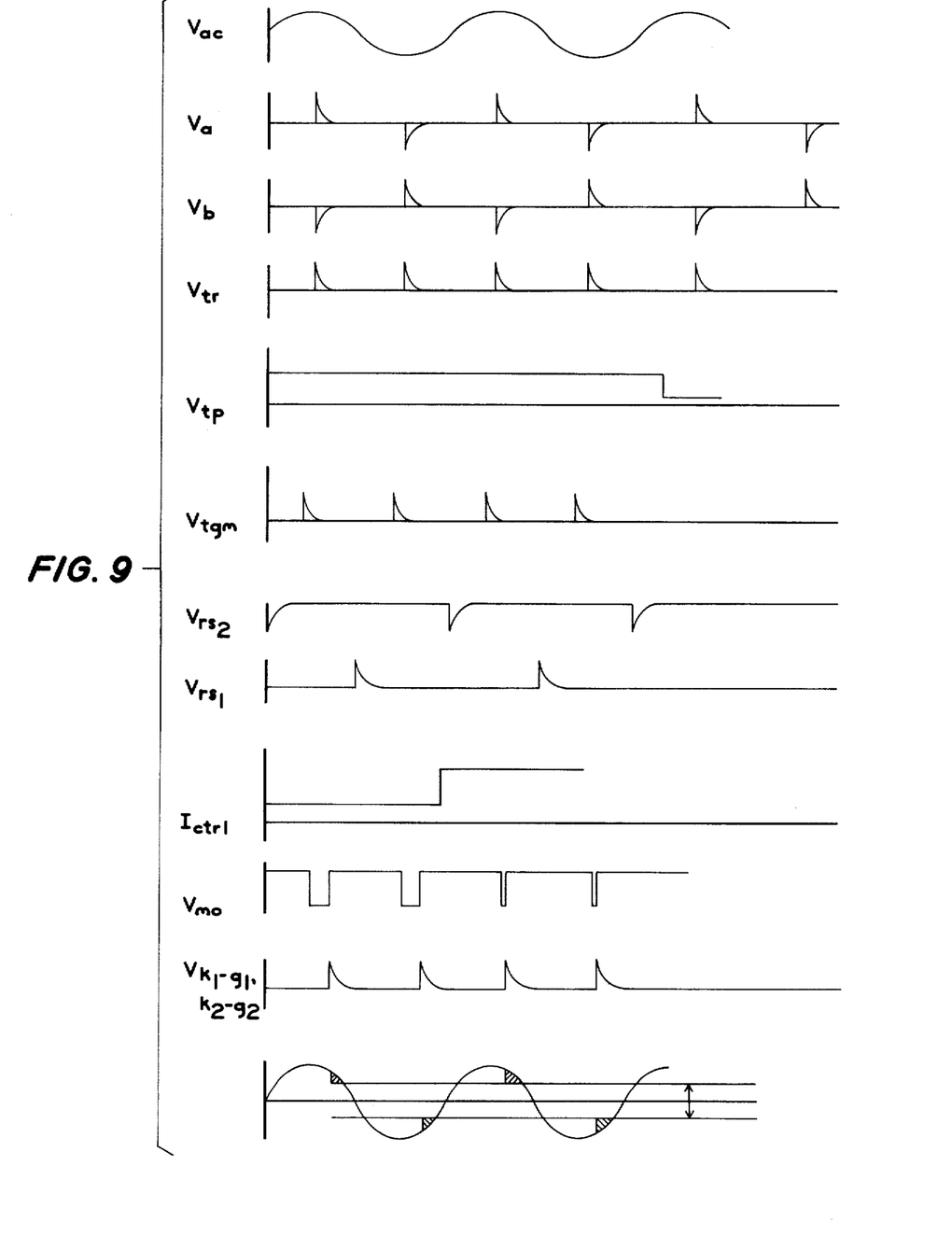
FIG. 9 shows a plurality of waveforms helpful in explaining the operation of the converter.

The control current may be referenced, if necessary, to the load voltage level using a suitable load voltage sensing device 24 which senses the level of the load voltage and provides a load voltage signal. The control current source may include a comparator for comparing the load voltage signal to a reference signal and means for proportioning the control current in relation to the load voltage. The control current is utilized to control the time width of the output pulses of the monostable multivibrator (FIG. 9, $V_{mo}$). Restated, the time interval or pulse width of the output pulses is determined by the control current.

The output pulse train of the multi-vibrator is then applied to the means 14 which triggers the SCRs into conduction. The means 14 is of a design that generates the actuating pulses in succession in response to the multi-vibrator output pulses, wherein each of the actuating pulses is timed to occur (FIG. 9, $V_{k1\text{-}g1, k2\text{-}g2}$) as the corresponding output pulse returns to its high state (FIG. 9, $V_{mo}$). The means 14 then applies the actuating pulses to the controlled gates, or the silicon controlled rectifiers (SCR). In response, each SCR conducts while the voltage between its anode and cathode stays positive and continues conducting until the voltage becomes almost zero. In effect, the point in time at which the controlled gates are actuated into a conducting state occurs at the end of each of the monostable output pulses $V_{mo}$ wherein the timing of the end of each pulse is dependent upon the amplitude of the control current.

Stated in other words, in operation, the monostable pulses are applied to actuate the monostable multi-vibrator and cause it to switch into its metastable state and this is timed to occur as the input AC reaches its maximum in the positive and negative half cycles. The metastable state lasts only for a short time period of time, however, thereby causing the monostable multivibrator to return to the stable state. The return normally occurs at a point in time before the AC supply goes through its transition from the positive to the negative or the negative to the positive half cycles. Otherwise monostable reset pulses are provided from a reset pulse generating means 31 to assure positively that the multivibrator is reset. The reset pulses are timed to occur at said transition to return the multi-vibrator to its stable state. Means for actuating the SCRs in response to the trigger pulse time the actuation so that the actuation occurs as the multi-vibrator switches back to its stable state.

According to another aspect of the present invention, the regulated AC to DC converter is provided with an overload protection circuit 26 which is designed so that it prevents the monostable multi-vibrator 13 from generating any triggering pulses and thus prevents the converting means 11 from converting the AC to a DC. The circuit may comprise an overload sensing means 26' adapted to sense a potential drop across a resistive element 27 inserted in the DC path and a coincidence gate 29 interposed between the overload sensing means 26 and the monostable multi-vibrator 13. The output (FIG. 9, $V_{tp}$) from the overload sensing means 26' controls the application of the output (FIG. 9, $V_{tgm}$) of the monostable multi-vibrator 13 as follows. The overload sensing means 26' is adapted to apply a logical 1 signal under the normal condition to the coincidence gate 29 which allows the gate to pass the output of the pulse generating means therethrough. The overload sensing means 26' generates a logical 0 signal when an overload is sensed and applies it to the coincidence gate 29 and prevents it from gating the train of trigger pulses from the pulse generating means.

According to another aspect of the present invention, there is provided in the present regulated AC to DC converter, the reset pulse generating means 31 adapted to generate a pair of trains of oppositely poled pulses (FIG. 9, $V_{rs1}$, $V_{rs2}$) occurring at the zero crossings of the AC supply. The trains of pulses are applied to the monostable multi-vibrator to assure that it is reset positively into its stable state after generating a trigger pulse so that it is conditioned to be ready to receive a succeeding monostable pulse. In this manner, the resetting means provides a positive step of assuring the operation of the converter where the absence of which may result in the operational failure of the converter due to a low control current.

Various circuit features of the regulated AC to DC converter described generally hereinabove in conjunction with the general functional block diagram shown in FIG. 1 will now be described in detail with a number of exemplary circuits illustrated in FIGS. 2-8.

Figure 2:
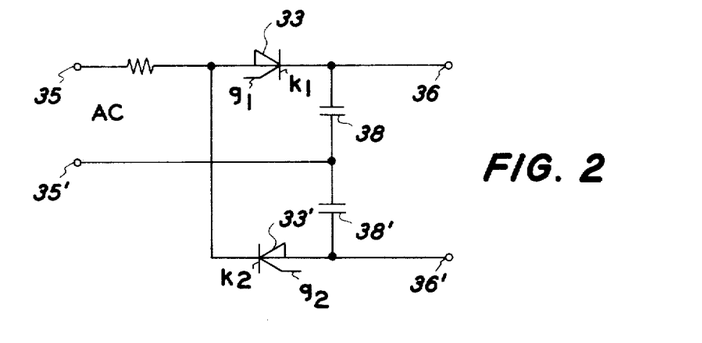
FIGS. 2 through 8 show schematic drawings of circuits for the various parts of the present converter.

Referring to FIG. 2, AC to DC converting means 11 used in the present converter may include a pair of silicon controlled rectifiers 33 and 33' operatively connected between the AC input terminals 35 and 35' and DC output terminals 36 and 36'. When actuated the SCRs 33 and 33' conduct during the corresponding half cycle of the AC while the potential drop thereacross is positive. Specifically, once triggered by an enabling pulse applied across the grid $g_1$ and cathode $k_1$, the SCR 33 conducts during the positive half cycle while the potential drop across it is positive. This continues until the potential drop reaches zero. The SCR 33' operates in the same manner except that it operates during the negative half cycle, that is, once actuated by the trigger pulse applied across its grid $g_2$ and cathode $k_2$, the SCR 33' conducts and continues to do so until the potential across it reaches zero. There is provided a pair of capacitors 38 and 38' connected in series and interposed between the two DC output terminals 36 and 36' to average out the AC rectified by the two SCRs 38 and 38'. The junction between the two capacitors is connected to an input terminal 35' of the AC source. One of the output terminals 36' acts as the DC zero for the converter. In operation, the amplitude of the DC output across the output terminal 36 and 36' of the above-described circuit is adjusted by the time duration during which each of the SCRs 33 and 33' are triggered into conduction during the corresponding half cycle of the AC supply. The AC to DC converting means 11 and the averaging capacitors 38 and 38' described above in connection with FIG. 2 are generally known and do not constitute a part of the present invention.

Figure 3:
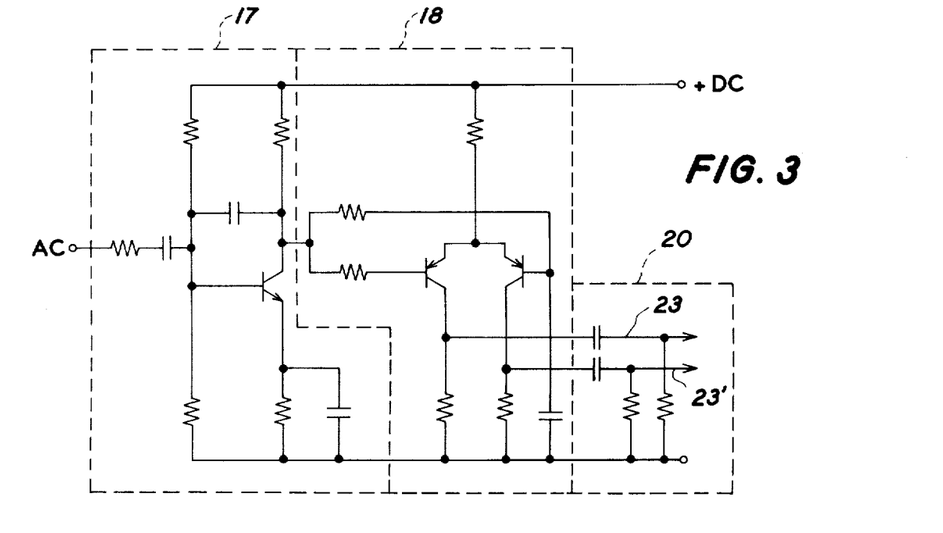

An exemplary circuit of the means for generating a train of the monostable pulses used for setting and resetting the monostable multi-vibrator in succession will now be described in connection with FIGS. 3 and 4. As shown, the monostable pulse generating means may be designed to derive the pulses from the AC supply. The AC supply is first phase retarded by a 90° phase delay circuit of a known type such as a Miller Integrator 17, amplitude limited, by limiter 18 and then differentiated by differentiator 20 of known design as schematically illustrated in FIG. 3. The monostable pulse generating means described above generates two trains of bipolar pulses at the two output terminals 23 and 23' of the differentiator 20. The monostable pulse generating means times the occurrence of the two pulse trains at the maximum points of the positive and negative half cycles of the AC input $V_{ac}$. The means is adapted also to generate the two trains of bipolar pulses out of phase. The two outputs are shown as $V_a$ and $V_b$ in FIG. 9. The monostable pulse generating includes further an OR 19 gate of a known construction using a pair of diodes and a transistor through which the outputs $V_a$ and $V_b$ are gated to provide a single train of output (FIG. 9, $V_{tr}$) or monostable pulses. The monostable pulse train output of the OR gate is then applied to the coincidence gate 29.

Figure 4:
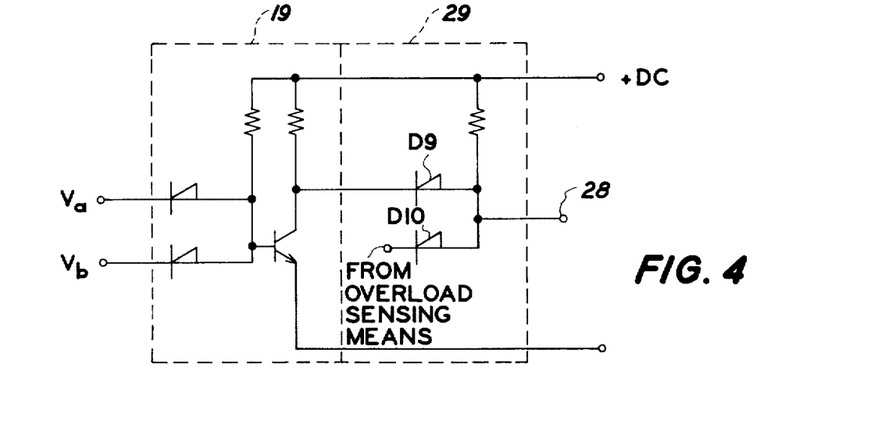

Referring to FIG. 4, the coincidence gate 29 may be of a design that comprises a pair of diodes D9 and D10 connected in a generally well known manner. The output of the OR gate 19 at the collector electrode of its transistor is connected to the cathode of one of the diodes D9 and the output of the overload sensing means 26 is connected to the cathode of the other diode D10. In operation, under no overload condition, the input to the diode D10 from the overload sensing means is high or logical 1 as shown in FIG. 9, $V_{tp}$ so that the diode D10 is reverse biased and placed in its non-conductive state. The input to the diode D9 is normally low. As the positive going pulses of the monostable pulse (FIG. 9, $V_{tr}$) come along in succession and is applied to the diode D9, the AND gate 29 gates them through D9 and applies them at its output terminal (FIG. 9, $V_{tgm}$) under no overload condition. When the overload trip signal is present, i.e., when overload condition is sensed by the overload condition sensing means 26' at time t, the output of the overload sensing means 26' goes from a high to a low or from logical 1 to 0 and this is applied to the cathode electrode of the diode D10 at time $t$. The resulting low or logical 0 signal causes the diode D10 to conduct and thereby clamp the output at 28 of the gate 29 to a low level. This prevents the AND gate 29 from gating the monostable pulses (FIG. 9, $V_{tr}$) through the diode D9 onto the output 28. This continues so long as the overload signal in the form of logical 0 is applied to the diode D10, that is, until the overload condition is manually reset. The train of monostable pulses gated through the AND gate 29 in the foregoing manner is then applied to the monostable multi-vibrator 13.

Figure 5:
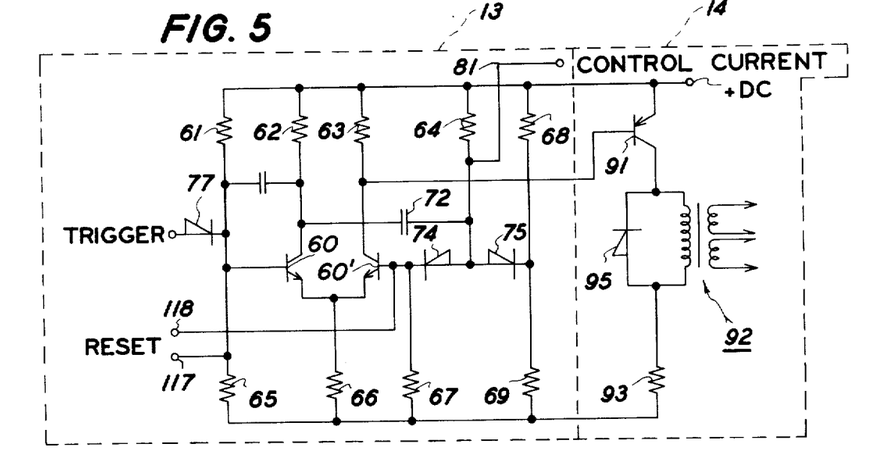

For the monostable multi-vibrator, one may use a known type such as the generally well known Kipp monostable multi-vibrator shown in FIG. 5 having a pair of transistors 60 and 60' and passive elements, namely resistors 61–69, capacitors 71, 72 and diodes 74, 75 of suitable magnitudes connected operatively in a well known manner. The transistors 60 and 60' and the passive elements are so selected and connected that the multi-vibrator is in a stable condition when the transistor 60' is in its conducting state and the transistor 60 is in its non-conducting state. When the transistor 60 is driven or switched into its conductive state by an input signal applied to the base electrode via a diode 77, the other transistor 60' is driven into its non-conductive state momentarily by the reverse biasing of the diode 74 caused by the voltage drop at the collector of transistor 60 coupled through capacitor 72. However, as the charge stored in the capacitor 72 depletes through control current line 81 and resistor 64, the reverse bias voltage across diode 74 decreases until diode 74 conducts once again and transistor 60' is turned on. This in turn causes the transistor 60 to turn off and thus revert or reset the monostable multi-vibrator to its stable state.

As noted above the conduction of the transistor 60 is momentary. The time period during which the transistor 60 conducts depends upon the amplitude of the control current coming from the current control source 23 (FIG. 1) and applied to the current control lead 81 at the junction of the capacitor 72 and the diodes 74 and 75. The control current flows to the bias resistor 67 via the diode 74 and also the resistor 69 via the diode 75. The IR voltage drop across the resistor 67 places the transistor 60' in its quiescent state when the multi-vibrator is in its stable state. During the metastable state, the control current discharges the capacitor 72, which is charged through resistors 62 and 69 and diode 75 when the multi-vibrator reverts to its stable state.

The time duration in which the transistor 60 remains conductive depends largely upon two factors: the RCA time constant formed by the capacitor 72 and the resistor 64 and the amplitude of the control current applied to the monostable multi-vibrator via the control current lead 81. With the present arrangement, the RC time constant is fixed since the RC parameters are fixed. Hence, the control of the time duration during which the transistor 60 conducts is dependent upon the amplitude of the control current (FIG. 9, $I_{ctrl}$). The time duration of the non-conductive of the transistor 60' is shown by the changes in the output voltage as the collector electrode of the transistor 60' switches from low to high and back to low as the transistor 60' is switched from its conducting to non-conducting state and back to its conducting state. This voltage is inverted by transistor 91 (FIG. 9, $V_{mo}$). Comparing the voltages at the collector of the transistor 91 to the control current (FIG. 9, $I_{ctrl}$) the amplitude of the control current controls the discharge time of the capacitor 72. Higher control current discharges capacitor 72 more quickly.

Referring to FIG. 5, the output is then applied to the means 14 for applying the trigger pulses to the control gates 33 and 33' of the SCR converting means 11. The means 14 for applying the output includes a transistor 91, a transformer 92 and a resistor 93 connected in series. A diode 95 is connected across the primary of the transformer 92 as shown to provide a discharge path for the primary current when transistor 91 is turned off. In operation, the output of the monostable multi-vibrator at the collector electrode of the transistor 60' applied to the base electrode of the transistor 91 causes the following operations to take place. As the voltage at the base electrode of the transistor 91 goes to a low level, it forward biases the transistor 91 and causes it to conduct. This causes the current to flow through the transistor 91 from emitter to collector, through the primary of transformer 92 and resistor 93. Consequently, a voltage is induced in the secondary windings of the transformer 92 due to the change in the field induced by the change in primary current. In turn, a voltage pulse is induced across the two secondaries of the transformer 92 in the form shown $V_{k1\text{-}g1, k2\text{-}g2}$ in FIG. 9. Note that the pulse induced in the secondary occurs at the end of the metastable state of the monostable multi-vibrator 13. The voltage induced in the secondaries of the transformer 92 is applied across the grid and cathode electrodes g1 to k1 and g2 to k2 respectively. Once the controlled gates, g1 and g2 of the silicon controlled rectifiers 33 and 33' are triggered by the induced voltage pulses from the secondaries on the transformer 92, the SCRs 33 and 33' are actuated into conduction selectively. The trigger pulses applied to the gates of the silicon controlled rectifiers occur sometime after the input AC reaches its maximum.

As stated before, once triggered into conduction, the SCRs continue to conduct until the potential drop thereacross becomes zero. Note that the potential drop across the SCR is formed by the difference between the DC output voltage as averaged out by the averaging capacitors 38 and 38' and the instantaneous potential level of the input AC. Since the phasing of the input AC is fixed, the time duration of the conduction of the controlled rectifier is dependent upon when the SCR is actuated into conduction by the trigger pulse coming from the secondaries of the transformer 92, and this is shown by the shaded areas in the wave forms $V_{scr}$ in FIG. 9. Note that with the higher control current amplitude, the SCRs conduct longer period of time.

According to another aspect of the present invention, as stated before, a resetting means is provided to insure that the monostable multi-vibrator used in providing the trigger pulses is reset in time to insure its normal operation. More specifically, referring to FIG. 6, such a means may comprise a transistor 101 arranged in a common emitter configuration with various passive elements operatively connected as shown. The resetting means is designed to generate two trains of pulses, one (FIG. 9, $V_{r2}$) of negative going pulses synchronized with the positive-going zero crossings of the AC and the other (FIG. 9, $V_{r1}$) positive going pulses synchronized with the negative-going zero crossings of the AC. As shown, the AC input is applied to the base of the transistor 101 via a resistor 103 and a capacitor 104. The base to emitter junction of transistor 101 is shunted with a diode 106 poled to provide a bypass when the potential drop across the base to the emitter is reversed biased by the input AC. The collector electrode of the transistor 101 is coupled to a pair of diodes 111 and 112 via a capacitor 113. The collector of the transistor 101 is also connected to the DC supply voltage source via a resistor 115. The diodes 111 and 112 are oppositely poled as shown so that the anode electrode of the diode 111 is connected to the output terminal 117 and the cathode electrode of the diode 112 is connected to the output terminal 118. The output terminal 117 is connected to the base electrode of the transistor 60 of the monostable multi-vibrator (FIG. 5) and the output terminal 118 from the diode 112 is connected to the base electrode of the transistor 60' of the multi-vibrator.

Figure 6:
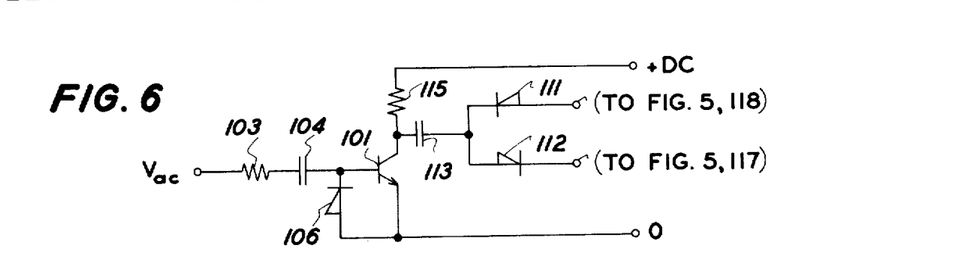
Figure 7:
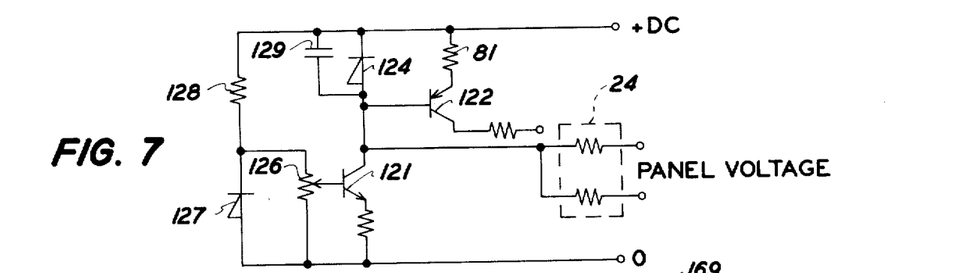

In operation, the reset pulse generating means of the FIG. 6 responds to the input AC and generates the two trains of pulses of the opposite polarity. The two output trains of oppositely directed pulses are applied to the base electrodes of the transistor 60 and 60' of the multivibrator (FIG. 5). In turn, the transistor 60 is turned off positively at the time of the positive going zero crossings of the AC and the transistor 60' is turned on positively at the negative going zero crossings of the AC. In the foregoing manner, the monostable multi-vibrator is assured to provide its intended function, namely, that the transistor 60 is reset into its non-conducting state and the transistor 60' is reset into its conducting state at the appropriate time, whereby the multi-vibrator is conditioned to receive the succeeding pulses of the monostable pulses coming from the coincidence gate 29 (FIG. 4).

According to another aspect of the present invention, the current control for the monostable multi-vibrator (FIG. 5) may be referenced to the level of the output load voltage. This may be done using a load comparator circuit (FIG. 7) of a suitable design which comprises transistors 121 and 122 and certain passive elements 124–129 operatively connected as shown. More specifically, the circuit includes the load voltage sensing means 24 (FIG. 1) which derives a voltage signal proportional to the load voltage. For example, the voltage applied to the sensing means 24 may be a voltage across a display panel electrodes. The load voltage level signal sensed by the sensing means 24 in the form of a voltage level signal is applied to the collector electrode of the transistor 121 and the base electrode of the transistor 122. The passive elements 123–127 are operatively connected in such a manner that the transistors 121 and 122 conduct. The current through transistor 121 is determined by the bias given to the base electrodes by the potentiometer 126. The potentiometer 126 is connected in shunt with a zener diode 127 of a predetermined breakdown voltage characteristics so that the diode provides the maximum potential drop that may be applied to the base electrode of the transistor 121. A resistor 128 is connected in series with the potentiometer 126 to act as suitable potential divider of the DC potential source for establishing a level of operation of the diode 127. Transistor 122 is a current amplifier applied to the difference between the current through transistor 121 and the current through sensing means 24. More specifically, an increase in the load voltage decreases the potential drop across the emitter and base of the transistor 122. This decreases the current through the base electrode of the transistor 122. In turn, the collector current of the transistor 122 decreases. The collector current induced in the foregoing manner is applied to the monostable multi-vibrator as the control current. As noted above, the control current appearing in the control current lead 81 is inversely related to the load voltage. Advantageously, the capacitor 129 provides an AC noise bypass that will also smooth out the effect of a sudden AC fluctuation of the load voltage before the control current is generated. This assures a gradual change in the duration of the pulses generated by the monostable multi-vibrator. The diode 124 provides a bypass for an abnormal situation where the voltage at the collector electrode of the transistor 121 exceeds the level of the DC bias potential source whereby the transistor 122 is prevented from conducting and applying the control current.

Figure 8:
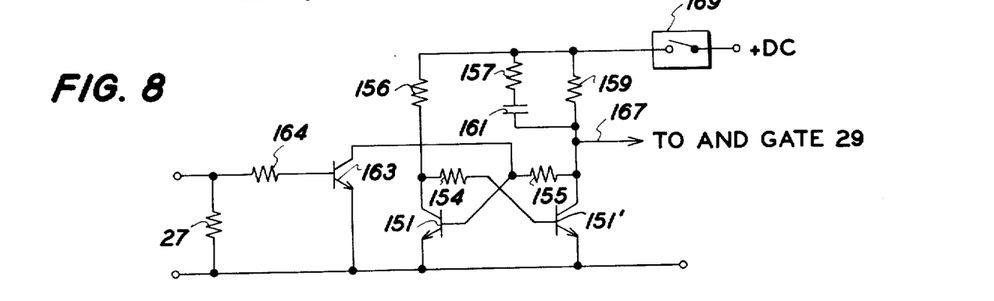

The overload trip feature of the present AC to DC converter may comprise a multi-vibrator of a type shown in FIG. 8 arranged to generate a trip signal when the load current sensed by the load current sensing means 27 (FIG. 1) exceeds a certain predetermined level. More particularly, referring to FIG. 8, the overload trip signal generating means may comprise a pair of transistors 151 and 151' and passive elements, namely resistors 154 through 157 and a capacitor 161 operatively connected as a bistable multi-vibrator. The input of the bi-stable multi-vibrator may be applied to the base electrode of the transistor 151 from the current sensing resistor 27 via a common emitter amplifier having a transistor 163. The current sensing resistive means 27 provide an IR voltage drop across the resistor 164 and the base to the emitter electrode of the transistor 163. The current sensing resistor 27 is of such a magnitude that it will establish enough potential drop across the base to emitter junction and forward bias it and cause the transistor to conduct when the current therethrough exceeds a certain level indicative of an overload condition. When the current sensed by the current sensing resistor 27 exceeds such a level, the transistor 163 conducts. In turn, it applies a current to the base electrode of the transistor 151. In turn, the transistor 151, which was in its conducting state is switched into its non-conducting state. In turn, the transistor 151' which is in its non-conducting state signifying no overload condition, is switched into its conducting state. Consequently, the normally high output level of the transistor 151' changes to a low output level when the overload is detected by the overload current sensing means 27. The output of the overload trip circuit at the collector electrode 167 is applied to the cathode electrode of the diode D10 (FIG. 4) of the coincidence gate. As explained before, in response to the overload current the trip circuit applies a low voltage signal to the gate 29 and prevents it from gating the monostable pulses onto the monostable multi-vibrator (FIG. 5). The overload trip circuit may further include a suitable switch 169 so that an operator can reset the multi-vibrator after it is set by the overload signal, after he removes the condition that has caused the overload situation and thereby condition the overload trip circuit for succeeding operation.

Briefly restated, the present regulated converter is designed to convert an alternating into a direct current wherein the mean level of the DC output is controlled by controlling the duration of the conduction of the SCRs of controlled gates during each half cycle of the input AC. In controlling the conduction duration an improved means for generating trigger pulses is provided that includes a monostable multi-vibrator and means for actuating the multi-vibrator so that it generates a train of the trigger pulses having widths keyed to the phase relationship of the input AC and DC load level. Advantageously, the converter is further provided with means for disabling the converter when the output becomes overloaded to assure safety of the operation of the output load whatever it may be. The converter is also provided with means for assuring that the monostable multi-vibrator is positively reset so that the operation of the multi-vibrator is rendered fail proof under the normal operating load condition.

Hereinabove, a regulated AC to DC converter circuitry of the present invention is described in conjunction with a specific illustrative embodiment of the principles of the present invention. Various other modifications and changes may be made to the embodiment of the present invention as described hereinabove, without departing from the spirit and the scope of the present invention.

What is claimed is:

1. In a regulated AC to DC converter including a pair of controlled rectifiers which are triggered into conduction selectively during the positive and negative half cycles of the alternating current, an improved triggering means comprising:

a monostable multivibrator for providing a train of output pulses,
means for driving said multivibrator to generate said train of output pulses in predetermined phase relation to the alternating current,
means responsive to the trailing edges of said output pulses for providing a train of trigger pulses,
means for actuating said controlled rectifiers into conducting states selectively in response to said train of trigger pulses, and
means for providing a control current to said multivibrator for controlling the width of the output pulses so as to control the time position of the trigger pulses relative to the phase of the alternating current, whereby the duration of the conduction of the controlled rectifiers in the corresponding half cycle of the alternating current is controlled.

2. The converter according to claim 1, further including
means for generating a train or reset pulses and applying said reset pulses to said multivibrator timed to occur at zero crossings of the alternating current.

3. The converter according to claim 1, wherein said means for driving said multivibrator includes:
means for phase-shifting the alternating current by 90°,
means for detecting zero crossings of the phase-shifted alternating current and generating a train of set pulses occurring at the zero-crossings of the phase-shifted alternating current, and
means for applying the train of set pulses to said monostable multivibrator to generate said output pulses.

4. The converter according to claim 3, wherein said zero crossing detecting means and set pulse generating means includes a limiter, pulse shaper and a negative logic OR gate connected in series.

5. The converter according to claim 1, further including means for detecting an overload condition and generating an overload condition signal and means for disabling said multivibrator driving means in response to said overload condition signal, whereby the generation of the trigger pulses is prevented.

6. The converter according to claim 2, wherein said means for applying said train of set pulses to said monostable multivibrator includes a coincidence gate having a first input means to which said train of set pulses are applied and a second input means to which said overload condition signal is applied.

7. The converter according to claim 6, wherein said overload condition detection means is adapted to apply a logical 1 to said coincidence gate under no overload condition and apply a logical 0 as the overload condition signal to said coincidence gate under the overload condition.

8. The converter according to claim 7,
wherein said overload condition detection means includes: resistive means inserted in the DC output path and means for sensing the voltage drop across said resistive means exceeding a predetermined level, and
a flip-flop being set to provide said logical 1 to said coincidence gate and being reset to provide said logical 0 to said coincidence gate in response to detection of the voltage exceeding said predetermined level.

9. The converter according to claim 1, wherein said control current providing means includes:
- means for sensing the load voltage and generating a load voltage level signal,
- means for providing a predetermined reference voltage,
- means for comparing said load voltage level signal to said reference voltage and generating said control current, and
- means for applying said control current to said multi-vibrator.

10. The converter according to claim 4, further including
- a reset pulse generating means having a limiter and a differentiator connected in series and interposed between the alternating current source and said monostable multi-vibrator and adapted to generate a first train of negative going pulses occurring at the positive going zero crossings of the input alternating current and being applied to said monostable multi-vibrator to reset it positively into its stable state after it is switched into its metastable state and a second train of positive going pulses occurring at the negative going zero crossings of the input alternating current to set positively the multi-vibrator into its stable state,
- whereby said multi-vibrator is positively conditioned to receive each of said train of pulses from said means for driving said monostable multi-vibrator and generate said output pulses.

* * * * *